United States Patent [19]
Gray et al.

[11] Patent Number: 5,706,348
[45] Date of Patent: Jan. 6, 1998

[54] USE OF MARKER PACKETS FOR SYNCHRONIZATION OF ENCRYPTION/DECRYPTION KEYS IN A DATA COMMUNICATION NETWORK

[75] Inventors: James P. Gray, Chapel Hill; Raif O. Onvural; Mohammad Peyravian, both of Cary, all of N.C.

[73] Assignee: International Business Machines Corporation, Armonk, N.Y.

[21] Appl. No.: 592,903

[22] Filed: Jan. 29, 1996

[51] Int. Cl.$^6$ .............................. H04L 9/08; H04L 9/00
[52] U.S. Cl. ................... 380/21; 380/9; 380/48; 380/49
[58] Field of Search ..................... 380/48, 49, 50, 380/59, 20, 43, 9, 21

[56] References Cited

U.S. PATENT DOCUMENTS

| | | | |
|---|---|---|---|
| 5,197,097 | 3/1993 | Takahashi et al. | 380/49 X |
| 5,303,302 | 4/1994 | Burrows | 380/49 |
| 5,321,750 | 6/1994 | Nadan | 380/20 |
| 5,442,702 | 8/1995 | Van Ooijen et al. | 380/49 X |
| 5,473,696 | 12/1995 | Van Breemen et al. | 380/49 |
| 5,555,256 | 9/1996 | Calamvokis | 380/43 X |

*Primary Examiner*—Bernarr E. Gregory
*Attorney, Agent, or Firm*—Gerald R. Woods

[57] ABSTRACT

To enhance the security provided by data encryption in a data communication network, encryption/decryption keys are changed periodically at the source and destination nodes for an established connection. A destination node must know not only the value of any new key but also when to begin using that key to decrypt received data packets. Synchronization (making sure a data packet is decrypted using a decryption key correlated with the encryption key used to encrypt the same packet) is achieved through the use of marker cells, which are special purpose cells. When a source node decides to activate a new key, previously sent to and stored at the destination node, a marker cell is transmitted by the source node to the destination node. When the destination node recognizes the marker packet, it discards it and activates the previously received key for use in decrypting subsequently received packets.

6 Claims, 5 Drawing Sheets

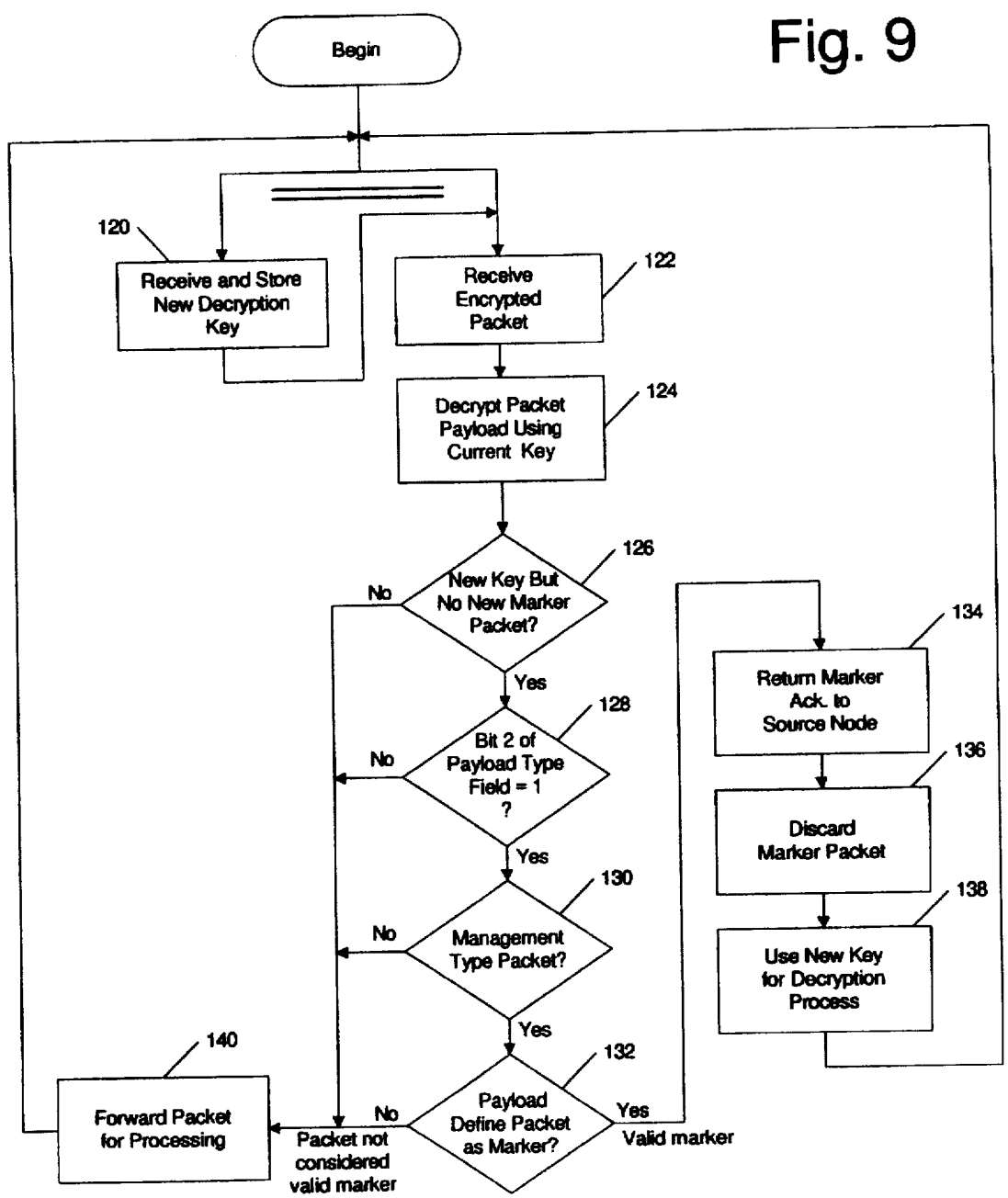

USE OF MARKER PACKETS FOR SYNCHRONIZATION OF ENCRYPTION/ DECRYPTION KEYS IN A DATA COMMUNICATION NETWORK

FIELD OF THE INVENTION

The present invention relates to data communications and more particularly to a technique for using marker packets to synchronize the use of encryption and decryption keys at source and destination nodes in a data communication network.

BACKGROUND OF THE INVENTION

Data communication networks can be categorized as handling transfers of data on either a circuit-switched basis or a packet-switched basis. Where two users want to exchange data in a network which utilizes circuit switching, a path must be established through the network before the data exchange can begin. Once the path is set up, it continues to exist for the duration of the data exchange between the users. If the same two users were connected through a packet-switched network, it would not be necessary to set up and maintain a "circuit" between them. In a packet-switched network, user data is formatted in discrete data units or packets, each of which contains the routing information needed by intermediate systems or nodes to transfer the packet toward its intended destination over currently available links. When an information exchange or call has been set up between a particular source node and a particular destination node, it is conventionally said that a "connection" exists between the two nodes even though there is no physical connection and successive data packets being transferred between the nodes may not even follow the same physical paths through the network in getting from the source node to the destination node.

A type of packet-switching technology that is becoming increasingly pervasive is Asynchronous Transfer Mode (ATM) technology. In ATM networks, user data is formatted in fixed length cells, each of which includes a header field and a data field. The standard header field is five bytes in length and contains all necessary control and routing information for allowing the cell to be switched through the network toward its destination. The standard data field is forty-eight bytes long. The use of fixed length cells permits much of the necessary switching within the network to be carded out using specialized, high-speed hardware switches.

Users of any kind of data communication network, and not just ATM networks, are often concerned about concealing their data from eavesdroppers (sometimes called interlopers) on the network. Considerable time and effort has been spent developing cryptographic techniques which permit original data (sometimes referred to as plaintext or cleartext) to be encrypted or "scrambled" before it is transmitted as "ciphertext" through the network and then decrypted or returned to its original or plaintext form once it reaches the intended destination. Many encryption techniques employ "keys", which are values that control the encryption and decryption processes.

An illustration of an extremely simple, and largely ineffective, encryption approach is to replace each plaintext character in a message by a character "n" positions away in the alphabet, wrapping or returning to the beginning of the alphabet where the plaintext character is within "n" positions of the end of the alphabet. For example, if n=3, the plaintext word "safe" would translate to the ciphertext word "vdih". In this example, 3 would be considered the encryption key. As long as the party receiving the ciphertext message knows the encryption method and the key, recovery of the plaintext message is relatively simple.

Any effort by an eavesdropper to recover plaintext from an encrypted message is referred to as an "attack" on the message. Just as there are different kinds of encryption, there are different kinds of attacks aimed at discovering the key used to encrypt the plaintext data. Where a user must select the encryption key, it is human nature for that user to select an easily remembered key, such the user's own last name or the name of a favorite hobby; e.g., "golf" or "sailing". Eavesdroppers can take advantage of human nature by employing a "dictionary attack" in which names, English words (for example, all of the words in an unabridged dictionary), birthdays, etc. are tried as decryption keys to see if plaintext is generated. Where an eavesdropper knows the names of the sending and/or receiving parties or the time of transmission of the ciphertext message or other transmission-related information, a "traffic analysis attack" may be mounted by using such information in an effort to find the encryption key. More detailed information about the subject of cryptography is available from a number of references, including the book Bruce Schneier,"Applied Cryptography—Protocols, Algorithms and Source Code in C", John Wiley & Sons (1994). While the present invention is intended for use in networks in which cryptography is practiced, the invention can be understood without requiring any information from this book.

In theory, nothing precludes the performance of encryption/decryption operations without changing the keys used to control such operations. In practice, it would be foolish to do that. The longer a particular key remains in use, the greater the chance that an interloper will discover that key and use it in a successful attacks on encrypted messages.

A standard data security practice is to periodically change the keys used for encryption/decryption operations. Each new key must be passed on to any node expected to decrypt data encrypted using that key. Equally significantly, a decrypting node must know when to begin using a new key. If a destination node uses an old key in an attempt to decrypt data encrypted at a source node using a new key, the destination node's output will be plaintext garbage, not useful data.

Conventionally, encryption/decryption keys are established when a connection is set up between two nodes and remain in use for the duration of the connection. Since some connections may persist for periods of weeks or even months, for example, between two host systems, a failure to change the keys other than at connection setup represents a data security risk.

SUMMARY OF THE INVENTION

The present invention is a simple technique for maintaining synchronization between the key used in encrypting a data packet at a source node in a data communication network and the key used in decrypting the same data packet once it is received at a destination node in the network. The technique permits keys to be changed without interrupting an established connection between the two nodes. Before a new key can be activated at a destination node, the key necessarily must have been communicated to that node. The destination node stores but does not immediately activate the received key. When the source node decides to activate the new key, it transmits a marker packet having a unique format. The source node then begins encrypting data packets using the new key. When the destination node recognizes the marker packet, it discards the marker packet and activates the new key to decrypt subsequently-received data packets.

BRIEF DESCRIPTION OF THE DRAWINGS

While the specification concludes with claims particularly pointing out and distinctly claiming that which is regarded as the present invention, details of the invention may be more readily ascertained from the following detailed description when read in conjunction with the accompanying drawings wherein:

FIG. 9 is a flow chart of key synchronization operations that are performed at a destination node when the marker packet of FIG. 8 is employed.

DESCRIPTION OF PREFERRED EMBODIMENTS

In the following description, the terms "cell" and "packet" may be used interchangeably to refer to a data unit consisting of a header portion and a data payload portion. For purposes of interpreting the description and the claims, it should not be assumed that the term "cell" is limited to a fixed length data unit or that the term "packet" is limited to a variable length data unit.

Figure 1:
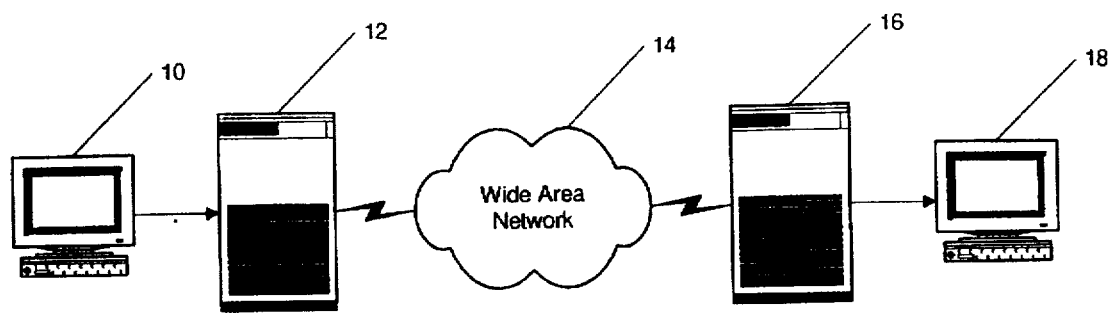
FIG. 1 is a simplified view of major components of a network in which the present invention may be practiced.

In any data communication network, the ultimate objective is to be able to transport data from a first user to a second user. While the term "user" is typically assumed to mean a human user, from a network standpoint, the actual data users are devices such processors, printers or even workstations, such as the workstations 10 and 18 shown in FIG. 1. The workstations 10 and 18 are connected to a shared wide area network 14 through intermediate communication processors 12 and 16, respectively. The functions performed by communication processors vary depending upon the characteristics of the wide area network and of the attached workstations. For example, if the wide area network 14 implements Asynchronous Transfer Mode (ATM) protocols, a communication processor might handle the functions of segmenting data received from a workstation into a series of fixed length data cells and of generating a header for each cell with information needed to transfer the cell through the network. Such functions are generally referred to as ATM adaption functions. The same processor might be used to encrypt that data. A counterpart processor at the receiver would reassemble the data into a format usable by the receiving workstation by decrypting the data contained in received cells and by reassembling the data into longer data segments usable by the receiving workstation.

Figure 2:
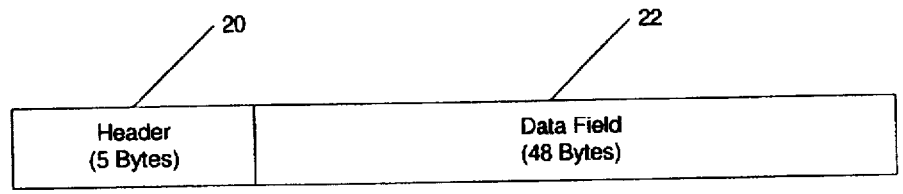
FIG. 2 shows the high level format of a standard Asynchronous Transfer Mode (ATM) cell.

Referring to FIG. 2 and as noted earlier, a standard ATM cell includes a five byte header field 20 which contains control and routing information for the cell and a forty-eight byte data field 22 which contains the actual user data and possibly an error checking character. From time to time, the data field 22 may be referred to as the "data payload" or just the "payload" of the cell.

Figure 3:
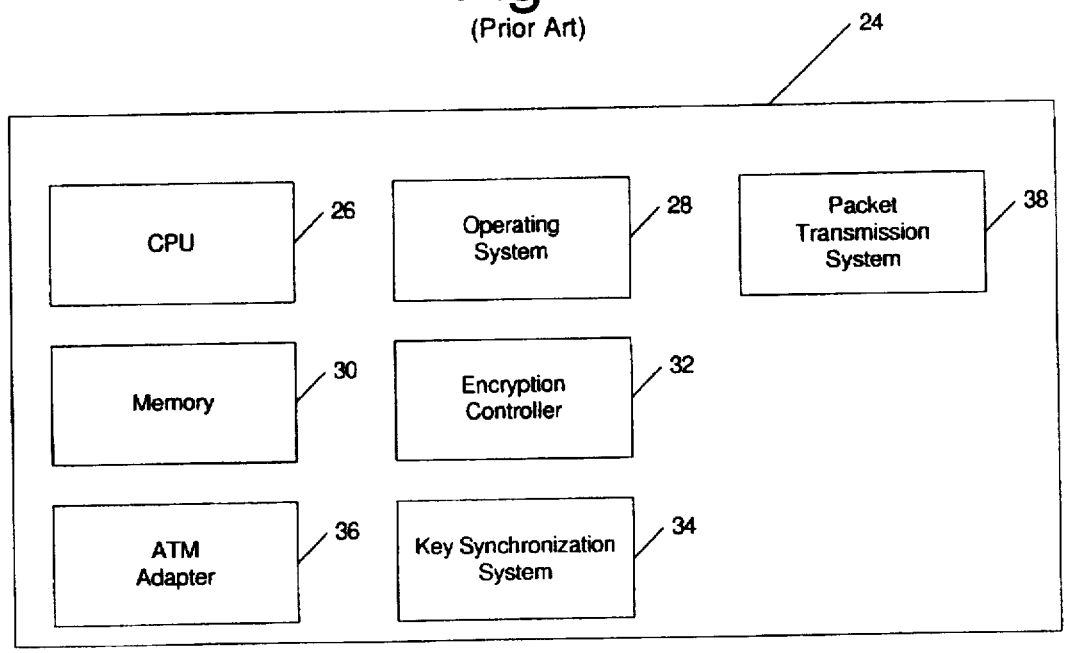
FIG. 3 is a simplified view of the major functional components of a source node capable of implementing the present invention.

For data to be successfully transferred in encrypted form from a source, such as workstation 10, to a destination, such as workstation 18, the devices which actually perform the encryption/decryption operations must synchronize their use of encryption/decryption keys. The necessary functions may be implemented either in software executed by a general purpose processor or as firmware or microcode written for a special purpose processor. In either case, some hardware, such as buffer registers or memory, is employed in the course of the process. FIG. 3 is a block diagram of functional components required to implement the invention at a source node 24. The source node 24 necessarily includes a processor or CPU 26 which operates under the control of an operating system 28 as well as memory components 30 for storing both data and program instructions. Assuming data supplied to the source node 24 is not already in standard ATM cell format, the system may include an ATM adapter component 36, which will convert received data to standard ATM format. The source node 24 also includes an encryption controller 32 which performs required encryption operations on the data payload of each ATM cell and a key synchronization system 34. The key synchronization system 34 will store needed encryption keys and perform other operations, to be described in more detail below, required to assure synchronization of encryption and decryption keys in active use at source and destination systems. The source node will further include a packet transmission component 38 for transmitting ATM cells after the data payloads in the cells are encrypted using the current encryption key.

Figure 4:
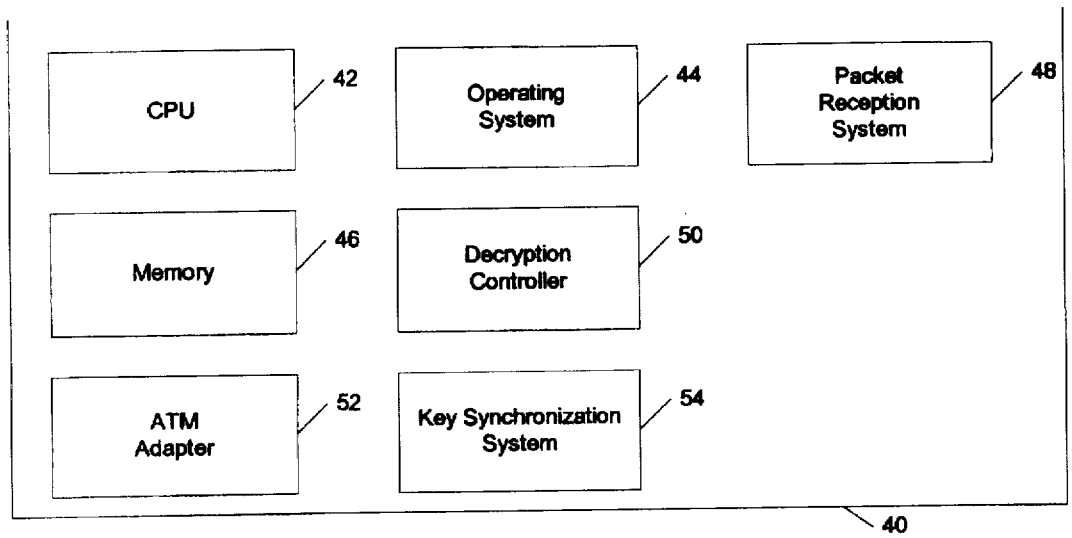
FIG. 4 is a simplified view of the major functional components of a destination node capable of implementing the present invention.

Referring to FIG. 4, a destination node 40 will have a number of components which also exist in a source node. For example, any destination node capable of implementing the present invention will include a CPU 42, an operating system 44 and memory 46. In fact, a given node ordinarily can operate either as a source system or a destination system at different times, which means that the same processor or operating system or memory will perform source or destination functions at different times. A destination node will also include a packet receiving system 48 for receiving ATM cells from the wide area network, a decryption controller 50 for decrypting the data payload of each cell and a key synchronization system 54 for making sure that the decryption key used for a particular ATM cell corresponds to the encryption key used in encrypting that same cell. Finally, unless the data is to be transported from the destination node in native ATM cell format, the node will include an ATM adapter function 52 for performing any necessary cell sequencing and desegmentation operations.

Figure 5:
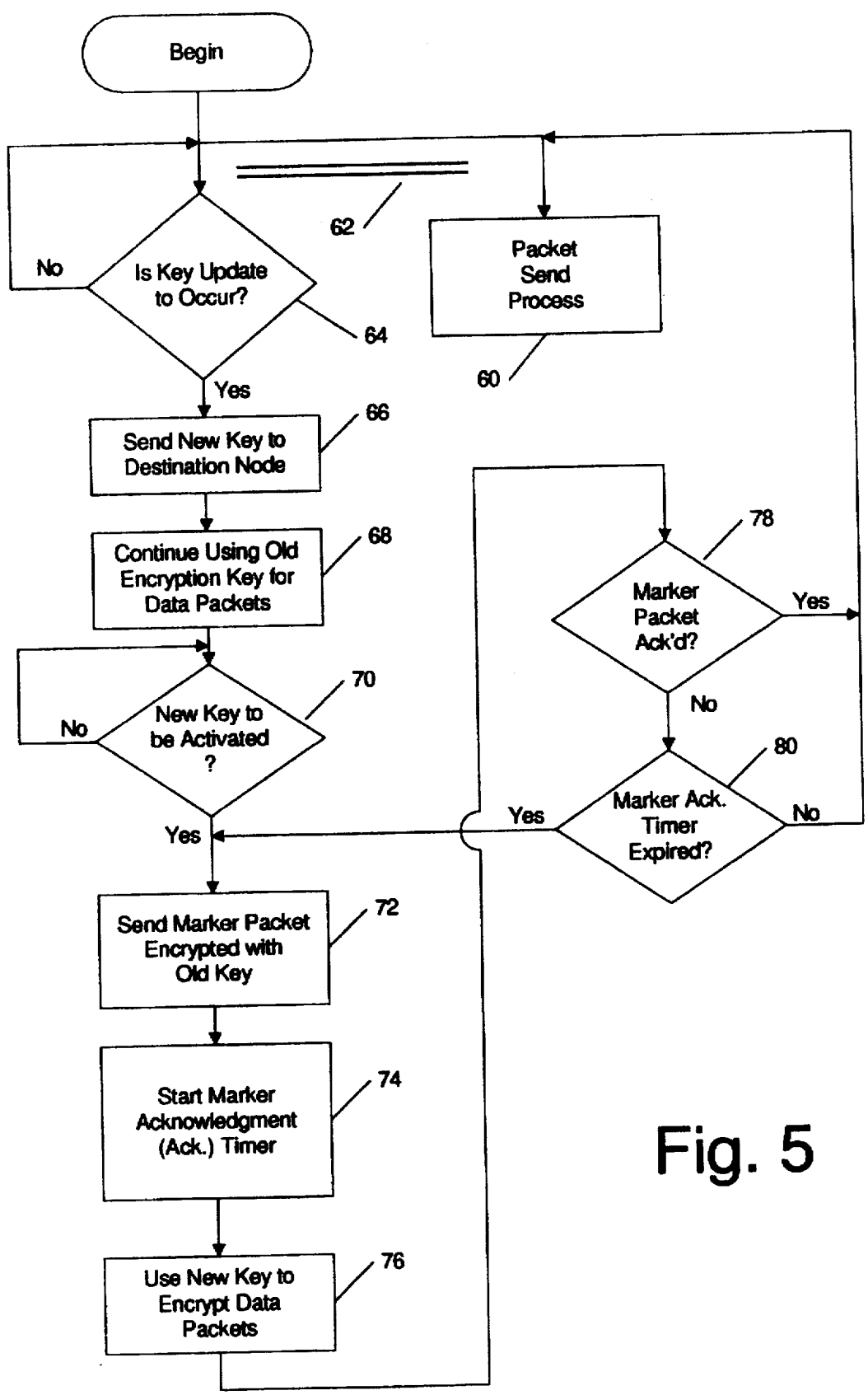
FIG. 5 is a flow chart of key synchronization operations that are performed at source node in accordance with the present invention.

Key synchronization operations can be performed using special purpose cells, called marker cells, to notify a destination node that it is to activate a previously received decryption key. FIG. 5 is a flow chart of steps that are performed at a source node in maintaining key synchronization using either of two types of marker cells, both of which will be described in detail later. It is assumed that the source node sends data packets as part of a packet send process 60. Symbol 62 is intended to represent that the packet send process 60 operates in parallel with and asynchronously to the key synchronization process. The point of entry into the key synchronization process is a test 64 whether a key update is to occur; that is, whether a new decryption key is to be sent to a destination node to which data packets are currently being transmitted. If a key update is to occur, the new decryption key is sent to the destination node in an operation 66 using a conventional secure and reliable key exchange protocol. The specific key exchange protocol employed is not critical to the present invention. It only matters that the new key is sent to the destination node at which it is eventually to be used.

After the new key is sent, the source node continues to use the old encryption key (operation 68) to encrypt data packets until a test 70 shows that the new decryption key is to be activated at the destination node. Once a decision is made to activate the new decryption key, key synchronization is initiated by having the source node transmit a marker packet (operation 72) to the destination node. The unique format of a marker packet is used to distinguish it from a data packet. The marker packet is encrypted using the old encryption key.

Upon transmission of the marker packet, the source node starts a marker acknowledgment timer (operation 74) and begins encrypting data packets using the new encryption key (operation 76) and sending those data packets to the destination node. The source node then begins to listen for an acknowledgment from the destination node that the marker packet has been received. If the acknowledgment is received while the marker acknowledgment timer is still running, the timer is reset and the normal packet send process 60 continues. If, however, no acknowledgment has been received, a test 80 is conducted to determine the marker acknowledgment timer has expired. If the timer has expired, another marker packet is transmitted and the timer is restarted. If the timer has not yet expired, the normal packet send process 60 continues with data packets being encrypted using the new encryption key.

Figure 6:
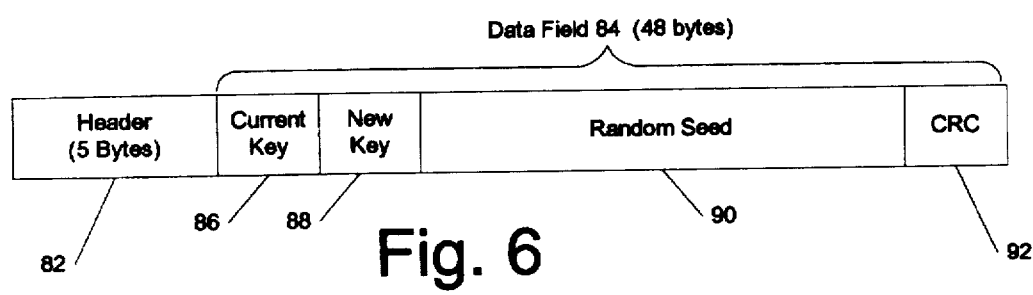
FIG. 6 shows the format of a market packet which can be used in key synchronization operations in one embodiment of the present invention.

FIG. 6 shows the format of one type of suitable marker packet. It is assumed that the packet again has the general form of a standard ATM cell with a five byte header field 82 and a forty-eight byte data field or payload 84. For this type of marker packet, the ATM header field 82 remains unchanged, but payload 84 includes several nonstandard fields; namely a current key field 86, a new key field 88 and a random seed field 90. The value stored in field 86 defines the key currently in use at the destination node. The value stored in field 88 defines the new key, already sent to and stored at the destination node. The random seed field is simply a random number which is used to pad the bit positions that would otherwise remain empty between the new key field 88 and a CRC field 92 used to store an error checking character.

Once the current key, the new key and the random seed have been written into the first "n" positions of the data field 84, the value of an error checking character is calculated based on the data in these positions. The specific process used to calculate the error checking character is not significant to the present invention. Preferably, a standard CRC (Cyclical Redundancy Check) process is used. The calculated CRC character is written into the CRC bit positions and the entire data field 84 is then encrypted using the current encryption key.

Figure 7:
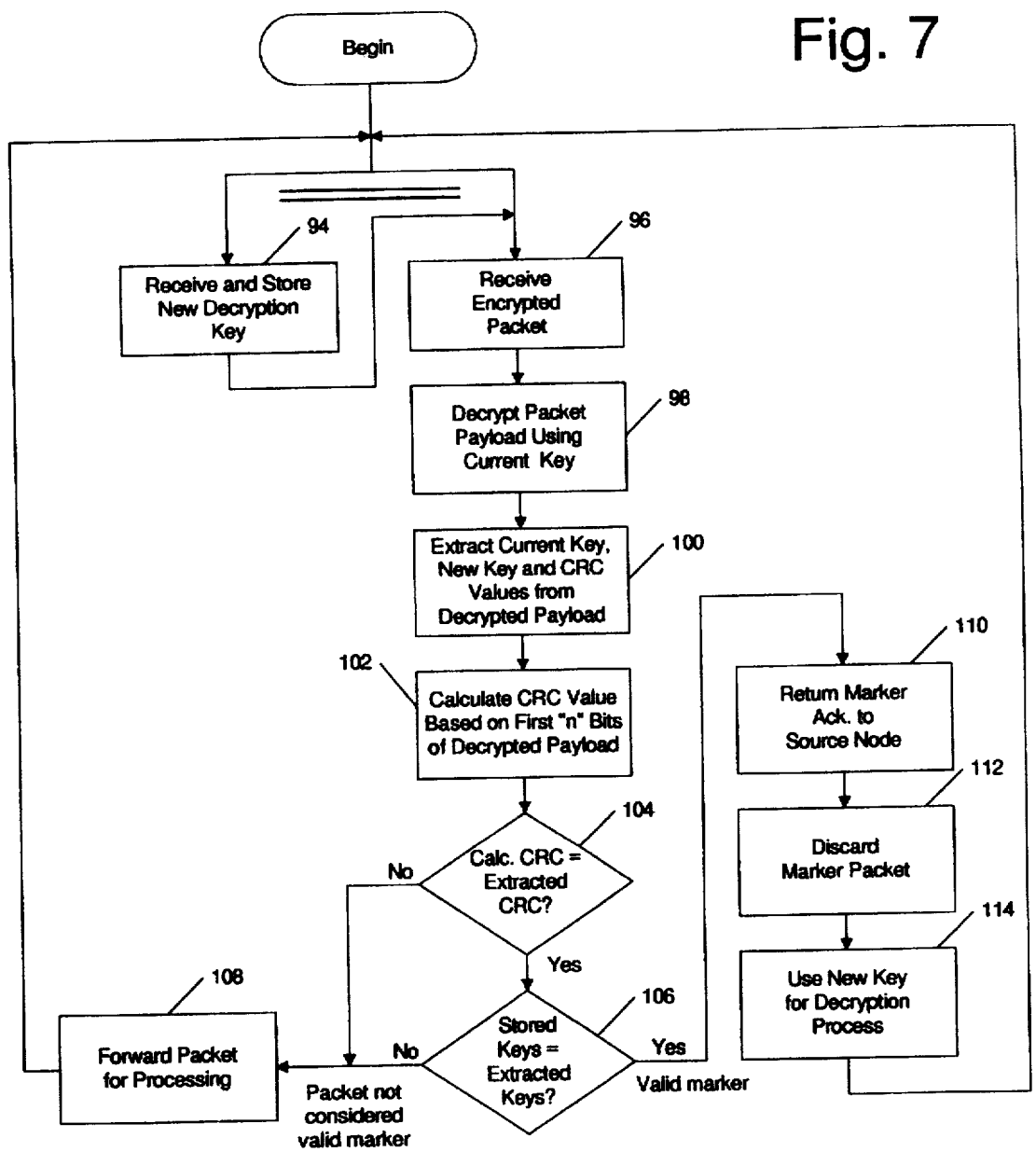
FIG. 7 is a flow chart of key synchronization operations that are performed at a destination node when the marker packet of FIG. 6 is received.

FIG. 7 is a flow chart of operations that are performed at a destination node at which decryption operations must be synchronized with encryption operations being performed at a connected source node. The destination node receives and stores a new decryption key in an operation 94 which is asynchronous to a normal packet receiving process 96. The data field of each packet received at the destination node is decrypted in an operation 98 using the currently active decryption key. The decryption operation restores the original data to the packet data field.

The identification of valid marker packets begins with the extraction (operation 100) of the values stored in the current key bit positions, the new key bit positions and the CRC bit positions in a packet's decrypted payload. A CRC value is then calculated at the destination node (operation 102) based on the data in the first "n" bit positions in the data field and compared (operation 104) to the extracted CRC value. If the calculated and extracted values are not equal, it is assumed that the packet is not a marker packet. The packet is forwarded in the destination node system for further processing in an operation 108.

If, however, the calculated and extracted CRC values match, which tentatively identifies the received packet as a marker packet, the identification is tested further in an operation 106 which compares the extracted current and new key values to the current and new key values, respectively, already stored at the destination node. If the keys' values fail to match, the packet is not considered to be a valid marker packet. If the keys' values do match, the packet is treated as a marker packet.

A marker packet acknowledgment is returned to the source node in an operation 110. The marker packet itself is discarded in an operation 112 and the destination node activates the new decryption key and applies it (operation 114) to subsequently received packets. The normal packet reception process then continues until the next key update operation.

Figure 8:
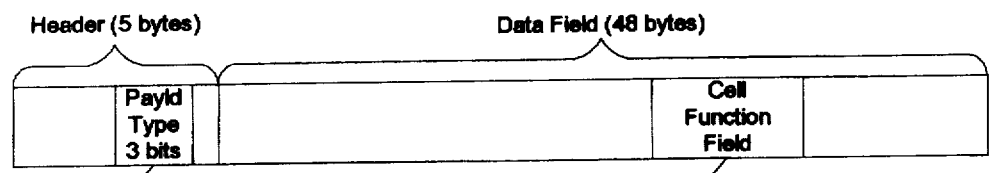
FIG. 8 shows an alternate form of marker packet defined using existing fields in a standard ATM cell.

The process described with reference to FIGS. 5 and 7 requires the generation of a marker packet having a special non-standard format. According to an alternative embodiment of the invention, a standard ATM cell can be used as a marker cell by extending the existing definitions of certain cell field values. Referring first to FIG. 8, a standard ATM cell header includes a three bit Payload Type subfield which identifies the type of data payload in the cell. Bit 0 of the subfield is set to "0" for a cell containing user data and to "1" for a cell carrying network operations and administration (OAM) or traffic control and resource management (RM) data. For simplicity, OAM and RM cells are referred to generically as management cells.

Each management cell contains, within the payload, a second field that more precisely identifies the function of the cell. While a number of cell functions have already been defined by ATM standards, a new function definition can be added; namely, a definition of a ATM management cell as a marker cell for purposes of key synchronization.

FIG. 9 is a flow chart of steps that are performed at a destination node in maintaining key synchronization where marker packets having the FIG. 8 format are employed. As before, a process 120 for receiving new decryption keys and for storing those keys operates asynchronously and in parallel with a normal packet receiving process 122. The payload of each received packet is decrypted (operation 124) using the decryption key currently active at the destination node.

A check 126 is then made to determine whether a new key has been received and stored without a new marker cell having subsequently been found. The purpose of check 126 is to reduce the number of packets which must be examined to determine whether they are marker packets. The only condition under which a marker cell should logically exist is where a new key has been received but not a marker cell activating that key. Under other conditions, indicated by a "no" response to test 126, the cell is assumed to be something other than a marker cell and is forwarded (operation 140) by the destination node for further processing.

In one embodiment of the invention, the number of potential marker cells which must be analyzed following test 126 can be reduced by making use of existing ATM standard definitions for the Payload Type field in a cell header. According to current ATM standards, Bit 2 of the Payload Type field is set to "1" to indicate the end of a data block and to "0" to indicate the beginning or middle of a data block. If Bit 2 of the Payload Type field in a marker cell is always set to "1", a test 128 of the Bit 2 value can be used to eliminate from marker cell analysis any cell in which Bit 2="0".

If test 128 fails to rule out a particular cell, then another test 130 is used to determine whether the cell is an ATM management cell. As noted earlier, management cells are defined by setting Bit 0 of the cell's Payload Type field="1". If test 130 finds Bit 0="1", the cell is tentatively identified at least as a management cell. To determine whether this management cell is really a marker cell, the cell definition field in the payload is tested (operation 132) to see if that field contains the appropriate marker cell definition.

Any cell which fails to satisfy any of tests 126, 128, 130 and 132 is assumed not to be a marker cell and is forwarded by the destination node. Certain of the listed tests are useful but not essential to a determination whether a particular cell is a marker cell. Specifically, the actual analysis whether a particular cell is a marker cell can be done relying on tests 130 and 132 alone. Tests 126 and 128 are not essential to that analysis but are likely to improve performance of the system by reducing the number of cells which must be analyzed using tests 130 and 132.

Once the destination node finally identifies a particular cell as being a marker cell, a marker acknowledgment message is returned to the source node in an operation 134. The marker cell is discarded in an operation 136 and subsequently received cells are decrypted (operation 138) using the new decryption key. Decryption using the new key continues until a replacement key is provided to the destination node in a subsequent key update operation.

While preferred embodiments of the invention are described, variations and modifications will occur to those skilled in the art once they become aware of the basic inventive concepts. For example, while the preferred embodiment calls for new keys to be distributed from a source node one at a time, it is within the scope of the present invention to distribute several keys to a destination node during a single key update operation. The destination node could store the keys in a list and could activate the next key on the list each time a new marker cell is detected. Finally, while the invention has been described for use in an ATM environment with its fixed length cells, it could also be effectively employed in systems in which variable length packets are used.

It is intended that the appended claims shall be construed as covering the preferred embodiment and all variations and modifications, including those described above, that fall within the true spirit and scope of the invention.

What is claimed is:

1. For use in a system including one or more source nodes for encrypting data using an encryption key, an interposed data communication network through which packets including encrypted data are transmitted, each of said packets including a header and a data payload, and one or more destination nodes for decrypting received data using a decryption key, a method of maintaining synchronization between the encryption key used at a source node to encrypt data and the decryption key used at the destination node to decrypt data, said method comprising the steps of:

sending a new decryption key from the source node to the receiving node;

storing the new decryption key at the receiving node;

at the sending node, transmitting a cell having a predetermined format when the new decryption key is to be activated;

at the receiving node, monitoring each received data packet to determine whether the packet has the predetermined format of a cell; and at the receiving node, when a cell having the predetermined format is detected, activating the new decryption key for use in decrypting subsequently received packets.

2. For use at a source node in a system including one or more source nodes for encrypting data using an encryption key, an interposed data communication network through which data packets including encrypted data are transmitted, each of said data packets including a header and a data payload portion, and one or more destination nodes for decrypting received data using a decryption key, a method of maintaining synchronization between encryption keys used at the source node in encrypting data and decryption keys used at a destination node to decrypt data, said method comprising the steps of:

sending at least one new decryption key to the destination node at which the key is to be used;

generating a marker cell having a predetermined format, which when recognized by a destination node, will cause a new decryption key to be activated at the destination node;

transmitting the marker cell to the destination node;

initiating use of a new encryption key to encrypt data, said new encryption key corresponding to the decryption key to be activated at the destination node upon receipt of the transmitted marker cell.

3. For use at a destination node in a system including one or more source nodes for encrypting data using an encryption key, an interposed data communication network through which data packets including encrypted data are transmitted, each of said data packets including a header and a data payload portion, and one or more destination nodes for decrypting received data using a decryption key, a method of maintaining synchronization between encryption keys used at the source node in encrypting data and decryption keys used at the destination node to decrypt data, said method comprising the steps of:

receiving at least one new decryption key from a source node;

storing each received new decryption key;

monitoring received data packets to determine whether any of such packets have a predetermined format;

upon detection of a received data packet having the predetermined format, retrieving a new decryption key from storage; and using the new decryption key to decrypt data in subsequently received data packets.

4. For use in a system including one or more source nodes for encrypting data using an encryption key, an interposed data communication network through which data packets including encrypted data are transmitted, each of said data packets including a header portion and a data payload portion, and one or more destination nodes for decrypting received data packets using a decryption key, a key-synchronizing system for maintaining synchronization between the encryption key used at a source node to encrypt data and the decryption key used at the destination node to decrypt data, said key-synchronizing system comprising:

at a source node from which the encrypted packet is to be sent, means for sending at least one new decryption key to the destination node which is to receive the packet;

at the destination node, means for storing each new decryption key that is received;

at the source node, means for generating a cell having a predetermined format;

at the destination node, means for monitoring each received data packet to determine whether the packet has the predetermined format; and at the destination node, means responsive to the identification of a received data packet having the predetermined format for retrieving a new decryption key from storage and for initiating use of that key to decrypt each subsequently received data packet.

5. A key-synchronizing source node for use in a system including one or more source nodes for encrypting data using an encryption key, an interposed data communication network through which data packets including the encrypted data are transmitted, each of said data packets including a header portion and a data payload portion, and one or more destination nodes for decrypting received data packets using a decryption key, said key-synchronizing source node comprising:

means for sending at least one new decryption key to a destination node to which data packets are to be sent;

means for generating a marker cell having a predetermined format, said marker cell being an indicator that a new decryption key is to be activated at a destination node to which the marker cell is sent; and means for sending the marker cell to at least one destination node.

6. A key-synchronizing destination node for use in a system including one or more source nodes for encrypting data using an encryption key, an interposed data communication network through which each data packets including the encrypted data are transmitted, each of said data packets including a header portion and a data payload portion, and one or more destination nodes for decrypting received data packets using a decryption key, said key-synchronizing destination node comprising:

means for receiving and storing one or more new decryption keys from a source node from which encrypted packets are being transmitted;

means for monitoring received data packets for any packet having a predetermined format; and means for activating a new decryption key upon detection of a received packet having the predetermined format.

* * * * *